United States Patent [19]
Holmes

[11] Patent Number: 5,904,892
[45] Date of Patent: May 18, 1999

[54] TAPE CAST SILICON CARBIDE DUMMY WAFER

[75] Inventor: Thomas M. Holmes, Grafton, Mass.

[73] Assignee: Saint-Gobain/Norton Industrial Ceramics Corp., Worcester, Mass.

[21] Appl. No.: 08/625,383

[22] Filed: Apr. 1, 1996

[51] Int. Cl.$^6$ .................................................. C04B 35/565

[52] U.S. Cl. .......................... 264/650; 264/670; 264/682; 264/166

[58] Field of Search ................... 264/650, 682, 264/166, 670

[56] References Cited

U.S. PATENT DOCUMENTS

| | | | |
|---|---|---|---|
| 2,486,410 | 11/1949 | Howatt | 264/650 |
| 3,726,737 | 4/1973 | Nishikawa | 156/210 |
| 3,879,509 | 4/1975 | Elderbaum | 264/56 |
| 3,998,646 | 12/1976 | Weaver | 264/655 |
| 4,525,429 | 6/1985 | Kaiser et al. | 428/566 |
| 4,598,017 | 7/1986 | Bayer et al. | 428/336 |
| 5,279,994 | 1/1994 | Kerkar | 501/94 |
| 5,480,695 | 1/1996 | Tenhover et al. | 428/65.5 |

FOREIGN PATENT DOCUMENTS

| | | | |
|---|---|---|---|
| 57-156376 | 9/1982 | Japan | 264/650 |

OTHER PUBLICATIONS

D. Hotza, P. Greil, "Review: aqueous tape casting of ceramic powders", 1995, Materials Science and Engineering A202, pp. 206–217.

A. Kristoffersson, E. Carlstrom, "Solid–State–Sintered Silicon Carbide by Water–Based Tape Casting", Fourth Euro Ceramics, vol. 1, pp. 367–374, Italy.

J.A. Lewis, K.A. Blackman, A.L. Ogden, J.A. Payne, L.F. Francis, "Rheological Property and Stress Development during Drying of Tape–Cast Ceramic Layers", Journal of the American Ceramic Society, vol. 79, No. 12, Dec. 1996, pp. 3225–3234.

R. Moreno, "The Role of Slip Additives in Tape Casting Technology: Part II—Binders and Plasticizers", American Ceramic Society Bulletin, vol. 71, No. 11, Nov. 1992, pp. 1647–1657.

Daniel J. Shanefield, "Organic Additives and Ceramic Processing, Second Edition: With Applications in Powder Metallurgy, Ink, and Paint", Cover page and p. 288, Hingham, MA.

G.P. van der Beek, U. Gontermann–Gehl, E. Krafczyk, "Binder Distribution in Green Ceramic Foils", Journal of the European Ceramic Society, vol. 15, 1995, pp. 741–758.

*Primary Examiner*—James Derrington
*Attorney, Agent, or Firm*—Thomas M. DiMauro

[57] ABSTRACT

This invention relates to tape casting a silicon carbide slip to eventually produce a silicon carbide wafer having a thickness of between 0.5 and 1 mm and a diameter of at least 150 mm, the wafer preferably having a strength of at least 30 MPa, and a porosity wherein at least 85% of the pores are no larger than 12 microns.

10 Claims, No Drawings

TAPE CAST SILICON CARBIDE DUMMY WAFER

BACKGROUND OF THE INVENTION

The manufacture of semi-conductor devices such as diodes and transistors typically requires the deposition of dielectric materials such as polycrystalline silicon, silicon nitride and silicon dioxide on the surfaces of thin silicon wafers. The thin layer deposition of these materials involves rapid heating and cooling cycles in an electrically heated furnace (or "diffusion process tube") at temperatures typically ranging from 250 to 1000 C. When dielectric precursor gases are fed into a diffusion process tube heated to these temperatures, the gases react and deposit the dielectric reaction product on the surface of the silicon wafer.

During the deposition step, the silicon wafers are supported is in vertical or horizontal boats placed within the process tube. The wafer boat and process tube are typically made of a material which has excellent thermal shock resistance, high mechanical strength, an ability to retain its shape through a large number of heating and cooling cycles, and which does not out-gas (i.e., introduce any undesirable impurities into the atmosphere of the kiln during firing operations). One material which meets these requirements is silicon carbide. For the above-mentioned application, silicon carbide diffusion components such as boats, paddles and process tubes are typically pre-coated with the dielectric selected for deposition.

When the silicon wafers are processed in a boat, it is naturally desirable that each wafer in the boat be exposed to identical gas concentration and temperature profiles in order to produce consistent product. However, the typical fluid dynamic situation is such that consistent profiles are found only in the middle of the boat while inconsistent profiles are often found at the ends of the boats, resulting in undesirable degrees of dielectric deposition upon the end-wafers which render them unusable.

One conventional method of mitigating this "end-effect" problem is to fill the end slots of the boat with sacrificial ("dummy") wafers made of silicon. However, it has been found that silicon wafers are expensive, extensively out-gas, warp at high process temperatures, flake particles, and have a short useful life span.

Another conventional method of mitigating the "end-effect" problem is to fill the end slots of the boat with dummy wafers made of alternative materials. For example, one investigator placed SiC-coated carbon wafers having the exact dimensions of the neighboring silicon wafers in the end slots. However, these wafers were found to break apart, contaminating the furnace with carbon particles. Another investigator proposed using CVD monolithic silicon carbide as a dummy wafer. However, this material is known to be very expensive. One prior proposal for producing silicon carbide wafers is a freeze casting approach which produces a green silicon carbide billet having a thickness of at least about 25 mm which is recrystallized and then sliced to a commercially useful thickness. However, it has been found that the freeze casting process produces significant porosity in the wafer (on the order of 40 v/o, with 15 percent of the pores larger than 25 $\mu$m). These large pores make it difficult to completely precoat the wafer with the dielectric and make the deposition process very expensive. JP Patent Publication No. 5-283306 ("the Toshiba reference") discloses forming a commercially useful wafer by grinding down a 2 mm thick siliconized silicon carbide disc to a thickness of about 0.625 mm, and then CVD coating the disc with an alumina-silica coating. However, the grinding, siliconization and CVD steps are expensive, particularly so in the low temperature (less than 1000 C.) applications where silicon infiltration is not required to prevent the oxidation of the silicon carbide.

Therefore, it is the object of the present invention to provide an inexpensive silicon carbide dummy wafer which possesses the dimensional, physical and mechanical properties required for use in applications with temperatures less than about 1000 C.

SUMMARY OF THE INVENTION

In accordance with a preferred embodiment of the present invention, there is provided a wafer consisting essentially of silicon carbide having a thickness of between 0.5 and 1 mm, a diameter of at least 100 mm, and a strength (as measured by ring on ring biaxial flexure) of at least 30 MPa (typically between 50 and 70 MPa), the wafer having a porosity wherein at least 85% of the pores are no larger than 14 microns. Preferably, the wafer has a density of at least about 2.15 g/cc, more preferably between 2.3 and 2.4 g/cc; its porosity is between about 14% and 16%, with at least 85% of its pores being no larger than 12 microns, and at least 95% of its pores being larger than 3 microns; the average pore size is between 6 and 10 $\mu$m, typically 8 $\mu$m; the silicon carbide is in recrystallized form and consists of between 40 and 60 w/o grains having a size of between 2 and 5 $\mu$m and between 40 and 60 w/o grains having a size of between about 30 and 200 microns; and, the surface of the wafer is unground.

Also in accordance with the present invention, there is provided a preferred process for making a thin, crack-free green silicon carbide sheet, comprising the steps of:

a) forming a slip comprising a liquid carrier (preferably, water) and a ceramic powder consisting essentially of silicon carbide, b) tape casting the slip to produce a wet green sheet having a thickness of between 0.6 and 1.2 mm, c) evaporating essentially all the liquid carrier from the wet green sheet to produce a dry green sheet having a thickness which is at least 80% of the wet green sheet thickness, d) forming a shape from the dried green sheet to produce a silicon carbide green wafer, e) recrystallizing the silicon carbide green wafer to produce a recrystallized silicon carbide wafer having a thickness of 0.5 to 1.0 mm and flatness of less than 130 $\mu$m and, optionally f) grinding the silicon carbide wafer to reduce its thickness by no more than 5%.

In preferred embodiments of this process, the silicon carbide powder consists of about 40 to 45 w/o grains having a size of between 2 and 5 $\mu$m and about 38 to 42 w/o grains having a size of between about 30 and 100 microns (wherein the w/o fractions are based upon total slip weight); the water content of the slip is between about 12 to 15 w/o of the slip; the total solids content (silicon carbide plus the solid portion of the binder) of the slip is between about 80 and 90 w/o of the slip; the density of the dry green sheet is at least about 2.3 g/cc; and the slip further comprises between 2 and 5 w/o of a binder having a glass transition temperature of less than 22 C.

Also in accordance with the present invention, there is provided a method of using a silicon carbide dummy wafer, comprising the steps of:

a) providing a silicon wafer diffusion boat having slots for the insertion of wafers, b) inserting into at least one slot of the silicon wafer diffusion boat a silicon carbide wafer of the present invention, said silicon carbide wafer having a coating of a dielectric material thereon, c) inserting into at least one other slot a silicon wafer, and d) depositing a dielectric material on the surface of the silicon wafer at a temperature of no more than 1000 C.

DETAILED DESCRIPTION OF THE INVENTION

It has been found that tape casting an aqueous-based bimodal silicon carbide slip, cutting out a green wafer from the tape, and recrystallizing the green wafer provides an inexpensive, low porosity, silicon carbide wafer suitable for use as a dummy wafer.

The level of porosity produced by tape casting bimodal silicon carbide slips in accordance with the preferred process of the present invention is typically on the order of about 14–16 v/o of the recrystallized wafer, with a pore size distribution wherein at least 95% of the pores are larger than 3 microns, at least 85% of the pores are no larger than 12 microns (preferably 10 microns), and the average pore size is between 4 and 8 $\mu$m, typically about 7 $\mu$m. Because the pores are both infrequent and relatively small, these wafers can be more evenly and less expensively precoated with the dielectric than can silicon carbide wafers from the freeze casting process. Moreover, because the wafers do not require silicon impregnation ("siliconization"), they are less expensive than siliconized silicon carbide wafers.

In addition, because the near net shape casting described above either reduces or eliminates the need for slicing and grinding, it is believed tape cast dummy wafers produced by the present invention can be produced at a significantly reduced manufacturing cost, regardless of whether the wafer is unsiliconized (for low temperature applications) or siliconized (for high temperature applications). So if an inexpensive siliconized wafer is desired, the relative absence of very fine pores (i.e., pores less than 3 $\mu$m) allows for easy siliconization.

Another novel feature of the present invention is its ability to reliably provide green silicon carbide wafers of the noted thickness which do not crack during drying. Typical prior art tape casting of silicon carbide was limited to using non-aqueous based slips to produce much thinner (i.e., 0.025 to 0.125 mm) green sheets. Because a dummy wafer should be the same thickness as a normal silicon wafer (i.e., about 0.625 mm to 0.725 mm), the thinner wafers produced from non-aqueous based slips would not be suitable as dummy wafers. Attempts at casting larger thickness sheets from these non-aqueous based slips typically resulted in excessive cracking. Without wishing to be tied to a theory, it is believed the excessive evaporation rate of the organic solvents in these conventional slips produced a pronounced vertical disparity in the drying rate of the relatively thick green sheet, leading to the formation of a dry skin on the top surface whose higher packing promoted cracking beneath the skin. In contrast, aqueous-based slips dry at a much slower rate. Since drying rate is slower, the evaporation profile is more uniform throughout the thickness of the sheet and formation of the undesirable dry skin is minimized. In addition, one preferred process of the present invention further enhances uniform vertical drying by heating the cast sheet from below the casting table, thereby promoting moisture removal from the bottom of the green sheet.

Moreover, it is believed that tape casting allows for reliable production of larger diameter silicon carbide dummy wafers than was previously known. In this regard, it is noted the Toshiba reference discloses a relatively small (150 mm×150 mm×2 mm) siliconized tile. It is also noted that one freeze casting approach which entails freeze casting a 200 mm diameter, 150 mm thick silicon carbide billet and then slicing the billet suffered from excessive cracking in the interior of a large number of the billets. In contrast, the process of the present invention allows for reliably producing suitable silicon carbide dummy wafers on the order of 200 mm and 300 mm diameters via tape casting.

Preferably, the grain size distribution of the silicon carbide grains used in the present invention is bimodal. It has been found that using a bimodal distribution produces much less shrinkage in the thin tape cast green sheet (on the order of only about 10% to 15%) than does a fine unimodal distribution (shrinkage on the order of about 85% to 90%). Since much less shrinkage is involved, the thickness of the tape is more easily controlled. Since the fine unimodal powders were the focus of the tape casting art, this advantage was not suggested in the prior art. Preferably, the bimodal SiC grain distribution comprises between about 38 and 42 w/o coarse SiC grains having a particle size ranging from 10 to 150 microns ("the coarse fraction"), and between about 40 to 45 w/o fine SiC grains having a particle size ranging between 2 and 4 microns ("the fine fraction"). More preferably, the fine fraction comprises about 43 w/o of the SiC grain and has an average particle size of about 2–3 microns, while the coarse fraction comprises about 40 w/o of the SiC grain and has an average particle size of about 60 microns. In some embodiments, the fine fraction is E277, a silicon carbide powder available from Saint-Gobain/Norton Industrial Ceramics Corporation ("SG/NICC") of Worcester, Mass., and the coarse fraction is F240, another silicon carbide powder available from SG/NICC.

In preferred embodiments of the slip, water is present in an amount sufficient to produce a slip having from about 80 to 90 w/o solids. The slip may also include conventional additives such as deflocculents, binders and plasticizers. In one preferred embodiment, the slip includes 13 w/o water, 0.01 w/o defocculant such as sodium hydroxide, and between about 1% and about 10% (preferably between 1% and 5%) of a binder having a glass transition temperature of less than 22 C. The amount of binder used in the present invention is typically less than the amount used in conventional silicon carbide tape casting, which is usually at least 10% of the slip. The use of a binder with a glass transition temperature below 22 C. eliminated the need for a plasticizer in this formulation. It is believed the lower binder fraction yields a more uniform pore size distribution. Typically, the silicon carbide, water and deflocculant components are mixed in a ball mill evacuated to a vacuum level of between about 27 and 30 inches Hg, the milling media is removed and the binder is added, and the entire mixture is rolled.

The tape casting step of the present invention is preferably accomplished by draining a reservoir containing the silicon carbide slip through a horizontally-disposed slit in the reservoir, the upper surface of slit being defined by a doctor blade and the lower surface of the slit being defined by an endless belt which moves under the doctor blade. Typically, the doctor blade is positioned between about 0.4 and 1.3 mm above the endless belt. In some embodiments, a heater is placed underneath the endless belt in order to provide a more uniform drying profile for the cast sheet. The initial thickness of the wet cast sheet thus produced is generally between about 0.4 and 1.3 mm. The cast sheet is then dried for 20–30 minutes on the heated belt, after which time the thickness of the cast sheet typically shrinks between about 10% and 15% to provide a green sheet having a density of between about 2.3 g/cc and 2.4 g/cc.

Next, the dried sheets are cut using circular punches to form green silicon carbide wafers having a diameter of between 100 and 300 mm and a thickness of between about 0.5 and 1.1 mm, preferably between 0.5 and 1 mm, more preferably between about 0.625 and 0.725 mm. When the wafers are in the range of about 0.625 mm and 0.725 mm, they do not need to be surface ground.

In some embodiments, the scrap material from the dried cut sheet is recycled. Preferably, the scrap is completely dispersed by milling overnight in 25 w/o deionized water; the resulting slip is then mixed with virgin silicon carbide powders and additives; remilled; and water is added to the slip to bring its viscosity to about 30,000 cps at 0.6 rpm. This recycled slip can then be used to make more green sheets, thereby essentially eliminating waste of the silicon carbide raw material.

In some embodiments, the cast wafers are heat treated prior to recrystallization in order to partially remove the binder. It has been found that partial removal of the binder (i.e., removal of about 15% to 25%) yields a fine pore structure in the sintered body which is advantageous for pre-coating. It is believed the partial burnout produces small diameter vapor "escape routes" for the remaining binder, thus preventing the creation of larger sized pores during the recrystallization process. In preferred embodiments, this entails exposing the cast wafers to air at a temperature of 220° C. and a pressure of 5 inches Hg for 8 hours.

Next, the dried green wafers are recrystallized. Recrystallization establishes strength-enhancing neck growth between the SiC grains without substantial densification. It is generally carried out at about 1900–1950° C. under a vacuum of about 0.6 torr in an Ar atmosphere. In preferred embodiments, the wafers are recrystallized at 1950° C. and 0.6 torr in argon. In some embodiments, the green wafers are stacked between surface ground silicon carbide plates in order to provide flatness.

A recrystallized wafer produced in accordance with the bimodal embodiment of the present invention typically exhibits a bulk density (as measured by mercury intrusion porosimetry) of at least about 2.15 g/cc, and preferably between 2.3 and 2.4 g/cc, a total porosity of about 14–16%, an average pore size of between 4 and 8 $\mu$m, with a pore size distribution wherein at least 95% of the pores are larger than 3 microns and at least 85% of the pores are no larger than 12 microns (preferably 10 microns). In preferred embodiments using a bimodal grain distribution, the fine fraction grains average about 2 to 5 microns and the coarse fraction grains average about 30 to 100 microns. It has a measure of flatness of no more than about 130 $\mu$m across a diameter of about 200 mm. Its strength (as measured by ring on ring biaxial flexure) is typically between about 50 MPa and about 70 MPa.

Recrystallized silicon carbide dummy wafers having diameters of at least 100 $\mu$m, preferably between about 150 and about 200 mm; thicknesses of between about 0.5 and about 1 mm, and preferably about between about 0.625 mm and 0.725 mm; and flatnesses of between about 50 and about 130 microns, preferably less than about 100 microns, are obtainable in accordance with this embodiment.

If desired, an additional firing step may be undertaken to make the wafer resistant to gas or liquid attack in high temperature applications. This typically involves either impregnating the recrystallized wafer with silicon to eliminate porosity and/or CVD coating it with an impermeable ceramic such as silicon carbide. If siliconizing is selected, it may be carried out in accordance with U.S. Pat. No. 3,951,587 ("the Alliegro patent"), the specification of which is incorporated herein by reference. Therefore, in accordance with the present invention, there is provided a wafer consisting essentially of silicon carbide having a thickness of between 0.5 and 1 mm, a diameter of at least 100 mm, the wafer being infiltrated with silicon so that the silicon is present as silicon pockets and comprises about 14 to 16 v/o of the wafer, and wherein at least 85% of the silicon pockets are no larger than 10 microns (preferably 8 microns) and at least 95% of the silicon pockets are larger than 3 microns. There is also provided a method of using this siliconized silicon carbide wafer, comprising the steps of:

a) providing a silicon wafer diffusion boat having slots for the insertion of wafers, b) inserting into the slot of the silicon wafer diffusion boat a silicon carbide dummy wafer as described in this paragraph, said dummy wafer having a coating of CVD silicon carbide thereon, c) inserting a silicon wafer into another slot in the boat, and d) oxidizing the surface of the silicon wafer at a temperature of at least 1000 C.

If CVD coating with silicon carbide is selected, it may be carried out by any conventional CVD SiC method. Likewise, the silicon carbide wafer of the present invention may be coated with a dielectric material such as polycrystalline silicon, silicon nitride, or silicon dioxide.

Conventional sandblasting of the siliconized SiC wafer can remove excess free silicon that has exuded to the surface due to the volume expansion of silicon on solidification. Because these wafers possess high strength, they do not break when subjected to sandblasting.

The novel recrystallized silicon carbide wafers of the present invention are preferably used as dummy wafers in silicon wafer manufacturing. However, they may also find application as rigid discs in computer hard drives; as substrates for other micro-electronic applications including acting as setters in single wafer processing and plasma etching; as substrates for flat panel LCD displays; or as baffle plates in wafer boats.

Also in accordance with the present invention, there is provided a preferred method of single wafer processing, comprising the steps of:

a) providing a silicon carbide disk of the present invention (preferably having a diameter of at least 200 mm and more preferably at least 300 mm) in a substantially horizontal position, and b) placing a silicon wafer (preferably having a diameter of at least 200 mm and more preferably at least 300 mm) upon the silicon carbide disc, and c) heating the silicon wafer at a rate of at least 100 C. per second.

Also in accordance with the present invention, there is provided a method of cleaning single wafer processing chambers, comprising the steps of:

a) providing a susceptor in a processing chamber, b) placing a silicon wafer upon the susceptor, c) processing the silicon wafer, d) removing the silicon wafer, e) placing a silicon carbide disk of the present invention (preferably having a diameter of at least 200 mm and more preferably at least 300 mm) over the susceptor, and f) in-situ cleaning the processing chamber by exposure to free radicals.

Also in accordance with the present invention, there is provided a method of flat panel display processing, comprising the steps of:

a) providing a silicon carbide plate of the present invention (preferably having a length of at least 165 mm and a width of at least 265 mm) in a substantially horizontal position, and b) placing a flat glass plate (preferably having a length and a width of at least 100 mm) upon the silicon carbide plate, and c) processing the flat glass plate by oxidation, dielectric deposition and/or diffusion at a temperature of no more than 800 C.

Also in accordance with the present invention, there is provided a method of plasma etching silicon wafers, comprising the steps of:

a) providing a silicon wafer having a predetermined diameter of at least 200 mm, b) placing a silicon carbide ring of the present invention (having an inner diameter essentially equal to the predetermined diameter of the silicon wafer) around the silicon wafer, and c) plasma etching (preferably, dry metal plasma etching) the silicon wafer.

Other contemplated uses of the silicon carbide wafers of the present invention (which could exploit an expected low pressure drop across the wafer) include gas burner plates, composite substrates and filters.

For the purposes of the present invention, "v/o" refers to a volume percent, "w/o" refers to a weight percent. In addition, the term "flatness" is considered to be the total spread between the minimum and maximum deflection from a flat granite plate.

EXAMPLE I

A bimodal powder consisting of about 42 w/o fine silicon carbide and about 39 w/o coarse silicon carbide and a deflocculant were mixed with about 8 w/o deionized water, 4 w/o latex binder and 6 w/o plasticizer (PPG). The resulting slip was milled overnight under vacuum. The viscosity of the slip was found to be about 30,000 to 35,000 cps at 0.6 rpm.

Bubbles were observed in the milled slip. These bubbles are believed to result in small pin holes in the green tape casting.

A conventional tape casting table was used to cast the slip. The unit included a drive control, mylar carrier, slurry reservoir, doctor blade, supporting table, drying unit and take-up drum. The unit also had an electric heater below the table so that moisture in the slip was removed from the bottom of the tape upwards, thereby preventing a skin from forming at the surface of the tape.

Eight foot lengths of slip were tape cast at 300 mm per minute in widths varying between 150 and 300 mm, and at a blade height of 1.25 mm. The cast tape was then dried for about 1 hour at 30° C. before removal from the table. The tapes were subsequently allowed to dry overnight at room temperature to enhance their green strength. The drying resulted in the tapes shrinking essentially exclusively in the thickness dimension so that the dried thickness was about 0.94 mm. Wafers were cut from the dried tape in diameters of about 100 mm, 150 mm and 200 mm.

In preparation for recrystallization, the green wafers were stacked between horizontal dense silicon carbide plates to form a column, with graphite paper inserted between each side of the green wafer to prevent sticking. The wafers were then recrystallized at 1950° C. and 900 mtorr.

The pin holes observed in the cast tape were not observed in the recrystallized wafers. However, some of the wafers were found to be bent around the edges and most displayed an imprint on their surfaces. The cause of the bending was believed to be the silicon carbide plates sliding during recrystallization, with the graphite paper providing lubrication for the sliding. The cause of the imprint was believed to be the thermal decomposition of the graphite paper.

Oxidation of selected recrystallized wafers having the imprint did not appreciably remove the imprint. The imprint, however, was not deleterious to the end product.

EXAMPLE II

In this example, scrap tape from experiments conducted in substantial accordance with Example I was used as a starting material. The scrap tape was completely dispersed by milling overnight in 25 w/o deionized water. The resulting slip was then mixed with the silicon carbide powders, deflocculant, binder, and plasticizer as above, and then milled overnight under vacuum in a nylon jug. Water was then added to the slip to bring its viscosity to about 30,000 cps at 0.6 rpm. Slip comprising up to 50 w/o scrap produced high quality tapes.

EXAMPLE III

This example attempted to reduce the pin holes observed in the green bodies of Example I. Since close observation of the slip revealed small, oily bubbles, it was believed the pin holes were the result of incomplete dissolution of either the latex binder or plasticizer. Since the plasticizer (polypropylene glycol) is prone to coagulation at the high shear rates found in milling, it was proposed that the plasticizer be blended with the slip after the water has coated the particles.

Accordingly, a new slip was prepared by vacuum milling the recycled slip of Example II, silicon carbide power, and deflocculant; removing the milling balls; adding the premixed binder and plasticizer, and then vacuum rolling the mixture in a nylon jug overnight. The resulting slip had a significantly lower viscosity (about 9900 cps at 0.6 rpm). Upon casting, it was observed that the frequency of pin holes was sharply reduced but not eliminated.

EXAMPLE IV

This example was performed in substantial accordance with Example I, except that a separate burnout step was incorporated before the recrystallizing step.

The green wafers produced in substantial accordance with Example I were set on recrystallized silicon carbide plates and the plates were stacked with silicon carbide spacers in between to form columns. These columns were exposed to air at a temperature of 200 C. and a vacuum of 5 inches Hg for 6 hours to promote burnout of the plasticizer. This treatment decomposed the plasticizer and cured the binder. The removal of the plasticizer eliminated wafer sticking and the subsequent need for graphite paper and hence the sliding problem described in Example I.

EXAMPLE V

Green wafers cast and subject to plasticizer burnout as in Example IV were stacked in groups of ten between a top and a bottom surface ground SiC plate, but without any graphite paper inserted therebetween. The wafers were then recrystallized as in Example I.

It appears that the wafers did not slide during recrystallization. Their measure of flatness was less than about 0.005". In addition, sticking between the wafers was minimal, as the wafers could be easily pried apart. Breakage from prying apart stuck wafers was only about 0–6%.

EXAMPLE VI

A bimodal powder consisting of about 43 w/o fine silicon carbide and about 40 w/o coarse silicon carbide and a deflocculant were mixed with about 13 w/o deionized water and 0.01 w/o NaOH solution. The slip was ball milled under vacuum (25 in. Hg) for 12 hours at 200 rpm. About 3 w/o of a latex emulsion binder was added and the slip was mixed without vacuum for 2 hours at 25 rpm. A trace amount of a surfactant (0.1 w/o) was also added to improve the wetting behavior of the slip on the mylar carrier. The total solids content of the slip was between 85 w/o and 90 w/o and the viscosity was about 20,000 cps at 0.6 rpm.

The tape casting table described in Example I was used to tape cast the slip. Tapes with a green thickness of 0.5–1.0 mm were obtained with the following casting parameters: a reservoir height of 10 to 30 mm, carrier speed of 0.4 to 1.1 m/min; doctor blade height of 0.4–0.7 mm; and under bed heating temperature of 35–45 C. Depending upon the thickness, the tapes required a total drying time of 20–40 minutes, resulting in a 10–15% shrinkage during drying. The green tape was collected from the exit end of the table and sectioned into 1 meter long sheets. Wafers were cut from the green tape in diameters of 100–300 mm. The green wafers were subject to binder burnout at 200 C. for 8 hours in air, and recrystallized as in Example V. The densities of the recrystallized wafers were between 2.3 and 2.4 g/cc.

The recrystallized wafers were then siliconized and sandblasted through conventional means. The densities of the resulting wafers were found to be about between 2.91 and 2.98 g/cc.

Preliminary studies of pressing the flexible green tapes with a hydraulic press at 8000 psi followed by binder burnout as in Example IV and recrystallization as in Example V have demonstrated an increase in density up to 2.55 g/cc while the average pore size was reduced to 6 microns. Similar results were obtained by other compaction methods such as cipping at 30,000 psi or passing the tape through a rolling operation.

I claim:

1. A process for making a thin, crack-free green silicon carbide sheet, comprising the steps of:

a) forming an aqueous slip comprising 1–5 w/o binder component having a glass transition temperature Tg of less than 22° C., and 80–90 w/o of a ceramic powder consisting essentially of silicon carbide, b) tape casting the slip to produce a wet green sheet having a thickness of between 0.4 and 1.3 mm, and c) evaporating essentially all the water from the wet green sheet to produce a crack-free dry green sheet having a thickness which is at least 80% of the wet green sheet.

2. The process of claim 1 wherein the slip comprises about 43 w/o silicon carbide grains having a size of between 2 and 5 μm and about 40 w/o silicon carbide grains having a size of between about 30 and 100 microns.

3. The process of claim 1 wherein the density of the green sheet is at least 2.3 g/cc.

4. The process of claim 1 wherein the slip comprises 2–5 wt % binder component.

5. The process of claim 1 wherein the slip comprises 3–5 wt % binder component.

6. The process of claim 1 wherein the silicon carbide powder is characterized by a bimodal grain size distribution.

7. The process of claim 1 wherein the slip comprises between about 38 and 42 w/o coarse silicon carbide grains having a particle size of between 10 and 150 μm and between about 40 and 45 w/o fine silicon carbide grains having a particle size of between 2 and 4 microns.

8. The process of claim 1 wherein the slip consists essentially of a) water, b) 1–5 w/o binder having a glass transition temperature Tg of less than 22° C., c) a ceramic powder consisting essentially of silicon carbide, and d) a defloeculant.

9. The process of claim 1 wherein the binder is a latex emulsion binder.

10. A process for making a silicon carbide body, comprising the steps of:

a) forming a slip comprising water, 1–5 w/o binder having a glass transition temperature Tg of less than 22° C., and a ceramic powder consisting essentially of silicon carbide, and b) tape casting the slip to produce a wet green sheet, c) drying the wet green sheet to produce an dry green sheet having a thickness of between 0.4 and 1.3mm, d) forming a shape having a diameter of at least 200 mm from the dry green sheet to form a green body, and e) recrystallizing the green body to form a silicon carbide body having a diameter of at least 200 mm and a flatness of less than 130 microns.

* * * * *